United States Patent Office 2,800,163
Patented July 23, 1957

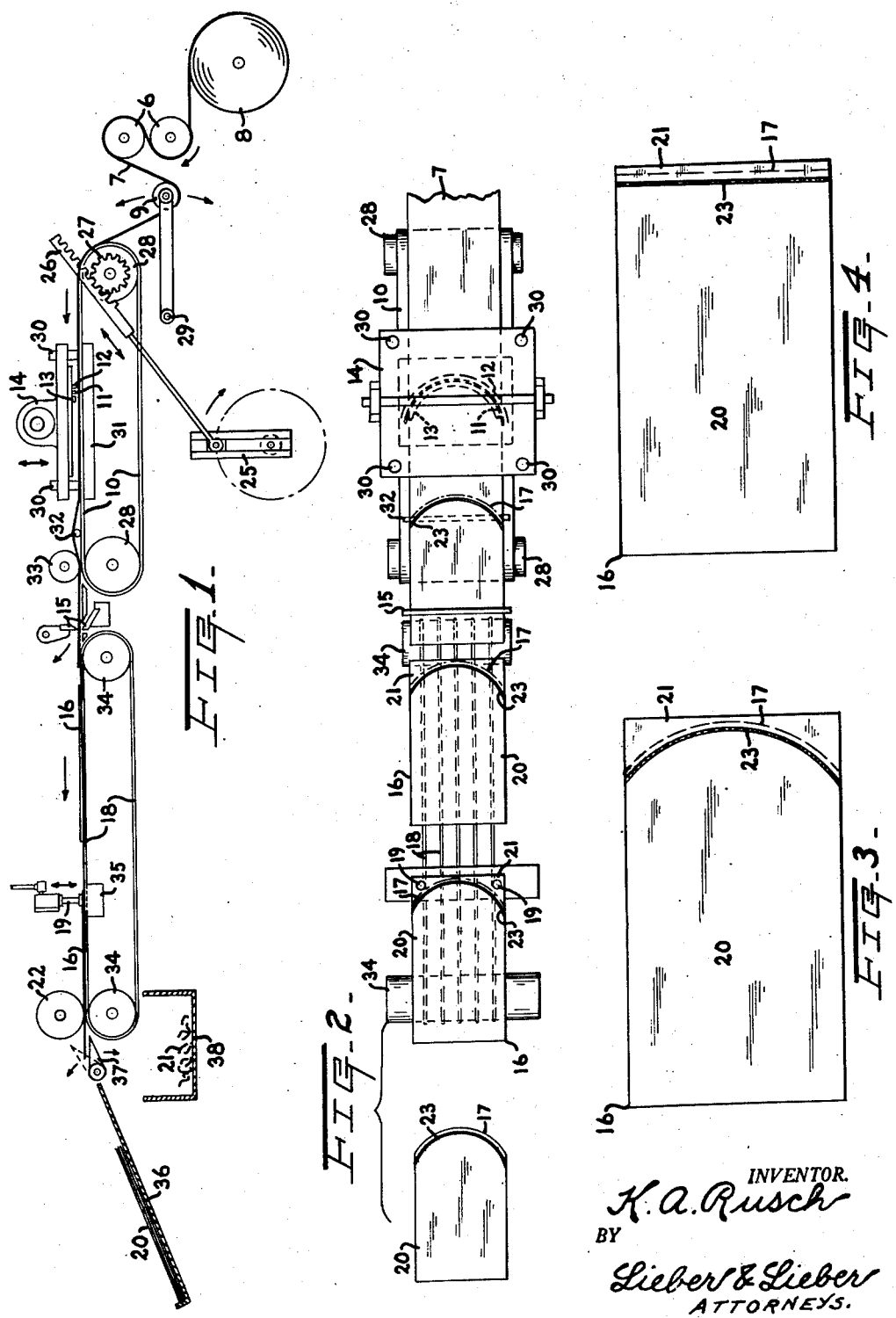

2,800,163

METHOD AND APPARATUS FOR PRODUCING FLEXIBLE CONTAINERS

Kenneth A. Rusch, Milwaukee, Wis., assignor to Milprint, Inc., Milwaukee, Wis., a corporation of Delaware Application December 28, 1955, Serial No. 555,870

12 Claims. (Cl. 154—42)

The present invention relates generally to improvements in the art of packaging, and relates more particularly to improvements in the provision of an apparatus and method for producing flexible pouch-like commodity containers.

A primary object of the invention is to provide an improved apparatus for commercially producing pouch-like containers which is extremely simple and compact in construction and which is adapted to rapidly, efficiently and automatically perform the steps of an improved pouch making method.

In the packaging field, there has been a growing demand for flexible containers formed of thermo-plastic materials such as polyethylene especially for use in the packaging of commodities such as fruits and vegetables. More recently, it has become relatively common practice to fabricate such containers from tubular stock which is extruded in long lengths of tubing and furnished to the packaging trade in roll form. In converting this tubular thermoplastic stock to commodity containers, the extruded tube is severed into successive sections of predetermined lengths and one end of each section is sealed transversely thereacross by application of heat and pressure to form the final pouch-like containers. While these thermo-plastic containers have enjoyed considerable commercial success with the demand therefor constantly increasing due to various advantageous factors, considerable difficulty has nevertheless been encountered by the packaging industry in the most economical conversion of the tubular stock to containers primarily because of the problems presented in handling the thin and highly flexible stock which becomes readily filled with static electricity and therefore clings tenaciously to adjacent surfaces.

It is therefore a more specific object of this invention to provide an improved method of and apparatus for producing pouch-like containers from tubular thermoplastic stock which obviates all of the disadvantages attendant the prior production thereof.

Another specific object of my present invention is to provide an improved method of and apparatus for continuously producing a succession of pouch-like containers from long lengths of flexible tubular stock in a rapid manner with utmost efficiency and at minimum cost.

Another specific object of the invention is to provide an improved method of and apparatus for the commercial production of commodity containers formed of thermoplastic materials which are normally subject to static electrification while obviating the difficulties generally encountered in the handling of such materials.

Still another specific object of the present invention is to provide an improved method of producing flexible containers, which comprises, longitudinally advancing a tube of flexible material along a predetermined path, sealing the tube transversely thereacross at spaced intervals to provide a succession of transverse seals, transversely perforating the tube adjacent to and rearwardly of each of the transverse seals, thereafter completely severing the tube transversely thereacross adjacent to and rearwardly of each of the lines of perforations while continuing the advancement thereof to thereby provide successive sections, and finally holding the trailing portion of each section beyond the transverse perforations thereof while continuing the advancement of the section to thereby remove such portion.

A further specific object of the present invention is to provide an improved apparatus for producing containers from flexible tubular material, comprising, means for longitudinally advancing the flattened tube along a predetermined path, means for sealing the tube transversely thereacross at spaced intervals, means for transversely perforating the tube adjacent to and rearwardly of each of the transverse seals, means for severing the tube transversely thereacross adjacent to and rearwardly of each line of perforations to provide successive separated sections, means for holding the trailing portion of each section beyond the transverse perforations, and means for continuing the advancement of the forward portion of each section while the trailing portion is held to thereby remove the trailing portion along the perforations.

These and other objects and advantages of the invention will become apparent from the following detailed description.

A clear conception of the several features constituting my present invention, and of the several steps of the improved method and the mode of operation of the apparatus, may be had by referring to the drawing accompanying and forming a part of this specification, wherein like reference characters designate the same or similar parts in the various views.

Fig. 1 is a more-or-less diagrammatic side elevation of a typical improved container-producing apparatus embodying the invention and showing the steps of the improved method;

Fig. 2 is a similarly diagrammatic top view of the apparatus likewise depicting the steps of the method;

Fig. 3 is a somewhat enlarged plan view of one of the containers formed by the improved apparatus and method showing the same just prior to the removal of the trailing portion thereof; and Fig. 4 is a similarly enlarged plan view of a somewhat modified container also formed with the aid of my improved apparatus and method and showing the same immediately before removal of the trailing portion.

While the invention has been particularly shown and described herein as being especially applicable to the production of commodity containers of pouch-like formation formed from continuous lengths of seamless tubing and of thermo-plastic film materials such as polyethylene, it is not desired or intended to unnecessarily restrict or limit the scope or utility of the invention by virtue of such limited embodiments, since the improved apparatus and method may obviously be utilized to excellent advantage in the production of flexible containers of various other materials and from tubing having a longitudinal side seam. It is also contemplated that certain specific descriptive terms used herein shall be given the broadest possible interpretation consistent with the disclosure.

In accordance with the improved method of commercially producing flexible containers, a tube of flexible thermo-plastic material in flattened condition is longitudinally advanced along a predetermined path. The tube is then provided with a succession of transverse seals by the application of sealing heat and pressure transversely thereacross at spaced intervals while the advancement of the tube is momentarily arrested, and as shown, these transverse seals may be of substantially arcuate shape or in a straight line extending perpendicularly to the side edges of the tube. Either simultaneously with the formation of the transverse seals or immediately thereafter, the tube is transversely perforated adjacent to and rearwardly beyond each of the transverse seals along a line substantially coinciding in contour with the seals, the perforations preferably being formed in the presence of or with the aid of heat. Thereafter, the tube is transversely completely severed thereacross adjacent to and rearwardly beyond each of the lines of perforations while the advancement of the tube is continued to thereby provide successive separated sections, the line of severance being substantially straight and perpendicular to the side edges of the tube regardless of the shape of the transverse seals. The trailing portion of each of the successive sections is then clamped or held in a suitable manner rearwardly beyond the transverse perforations thereof while the advancement of the forward portion of the section is continued by pulling the same longitudinally to thereby remove the trailing portion thereof along the perforations, and while any suitable means for clamping or holding the trailing portion may be utilized, it is preferable to perform the clamping action at the corners of the trailing portions as shown in order to obtain a better grip and to cause the perforations to be torn from the side edges of the tube inwardly. Finally, the forward portions of the successive sections are separated from the removed trailing portions in any suitable manner as the successive sections are advanced, and the final pouches are stacked for subsequent use.

Referring to the accompanying drawing, the improved apparatus shown more-or-less diagrammatically therein for producing flexible containers in accordance with the improved method comprises, in general, means such as a pair of cooperating draw and guide rolls 6 for longitudinally withdrawing and guiding a flattened tube 7 of thermo-plastic flexible material from a rotatably supported supply roll 8 to the upper run of an intermittently driven endless conveyor belt 10 past a looper or take-up roll 9; sealing means such as a heated bar 11 extending transversely across the upper run of the belt 10 and above and across the path of the tube 7, the heat sealing means being normally supported out of contact with the tube; means such as a perforating knife 12 also extending across the upper run of the belt 10 and above and across the path of the tube 7 adjacent to and rearwardly of the sealing bar 11, the perforating knife also normally being retained out of contact with the tube 7; means such as an electric heating element 13 for heating the sealing bar 11 and the perforating knife 12; means such as a vertically movable carrier or supporting member 14 for intermittently moving the sealing bar 11 and knife 12 respectively into effective sealing and perforating contact with the tube 7; means such as a cut-off knife 15 extending transversely across the path of the tube 7 beyond the conveyor 10 and intermittently cooperable with the tube for completely severing the same into successive sections 16 adjacent to and rearwardly of each of the lines of perforations 17 formed by the knife 12; means such as an endless belt 18 for continuing the advancement of the tubular sections 16 away from the knife 15; clamping means such as one or more intermittently air-operated plungers 19 cooperable with the trailing portion 21 of each of the successive sections 16 rearwardly of the transverse perforations 17 thereof to clamp and hold the same; and means such as a pressure or take-away roll 22 cooperable with the belt 18 to grip the forward portion 20 of each of the successive sections 16 in advance of the transverse seal 23 therein for pulling the same longitudinally away from the clamping means 19 to thereby remove the clamped portion 21 of each section 16 along the perforations 17 thereof.

One or both of the draw rolls 6 may be driven in a suitable manner by a chain or belt drive from the driven shaft of an engine or motor, not shown, and the endless belt 10 is intermittently driven by a suitable drive which is shown as consisting of a cam or cam arm 25 likewise driven by a suitable engine or motor in customary fashion and carrying a rack 26 drivingly associated with a pinion 27 on one of the supporting sheaves or rollers 28 of the belt, the pinion 27 and belt drive roll 28 incorporating a one-way clutch which is effective to prevent reverse rotation of the roller 28 and thereby cause the movement of the belt 10 to be arrested during the upward movement of the pinion 26 by the rotating cam 25. The looper or take-up roll 9 is pivotally mounted at 29 to permit the same to swing freely as indicated by the arrows so that the weight of the roll cooperates with the tube 7 to take up any slack during the advancement thereof, and it is believed apparent that the draw rolls 6 cooperate with the belt 10 and the looper roll 9 to advance the stock from the supply roll 8 past the heat sealer and perforated cut-off knife. The carrier or support 14 for the heat sealing bar 11 and heated perforating knife 12 is guided for vertical reciprocable movement on guide posts 30, and this member 14 may be coupled with the drive roll 28 for intermittent operation in any suitable manner so that it is lowered simultaneously with the stopping of the belt 10 and is raised out of contact with tube 7 during times of movement of the belt, a suitable back-up plate 31 being provided on the lower side of the upper run of the belt 10 to permit application of pressure by the heat sealing bar 11 and the perforating knife 12 when these elements are lowered against the tube. Since a high degree of static electricity is created in the tube 7 during the advancement thereof and during the sealing and perforating operations, a belt release rod or roll 32 is preferably provided for positively releasing the tube 7 from the belt 10 as it leaves the sealing and perforating zone, the rod 32 being disposed between the upper surface of the belt 10 and the tube 7 as shown, and a pressure roll 33 cooperable with the belt 10 is provided adjacent to the release rod 32 for positively advancing the stock 7 to the cut-off knife 15. The cut-off knife 15 may also be driven in a convenient manner from the drive shaft of the engine or motor, and this knife may be timed in any suitable manner so as to perform the sheer cut operation at the proper moments to provide the successive sections 16. The clamping plunger may be suitably operated as indicated by air with the air cylinder being actuated in a convenient manner as by means of a solenoid valve timed from the main drive shaft to cause the plunger 19 to become effective at the proper moments. The belt 18 may be driven in a continuous manner in any suitable fashion as by means of a chain or belt drive extending from one of the belt drive rolls 34 to the driving source, and the belt 18 is backed by a suitable back-up member 35 below the clamping members 19 so as to permit the clamps to become effective. From the take-away roll, the finished pouch consisting of the forward portions 20 of each of the successive sections 16 are conveyed to a stacker 36, and the trailing portions 21 of the successive sections which are removed by the clamp 19 may be separated in a convenient manner as by means of a swinging member 37 intermittently driven in any suitable manner to swing into the path of the removed portions as indicated by dotted lines and cause the same to fall into a scrap box 38.

From the foregoing detailed description, it is believed apparent that the present invention contemplates the provision of an improved method of and apparatus for rapidly and effectively producing flexible pouch-like tubular stock in a most economical manner. The improved method and apparatus are particularly applicable to the production of containers from materials which normally possess a high degree of static electrification such as polyethylene, and the container units are rapidly produced with minimum slow-down in operations because of the fact that the tubular stock is advancing longitudinally in a most continuous manner without surface-to-surface contact of the material until the final stacking of the units. It is apparent that the stock is advanced as a tube by drawing or pulling operations until the shear cut operation performed by the knife 15 at which time the transverse seal 23 has already been effected, and this drawing or pulling of the tubular stock to a point beyond the transverse sealing step is permitted by reason of the perforating knife which transversely perforates but does not sever the tubing at a point immediately adjacent to and rearwardly of the successive seals. In addition to its function in permitting the several steps to be carried on while the stock is still in the form of a continuous tube, the hot knife perforations 17 cause the walls of the material to be sealed along the perforated portions thus resulting in a reenforced bottom for each of the final containers, and these pouch-like containers have proven extremely durable in actual use and are particularly useful in the packaging of produce such as fresh fruits and vegetables. The improved method has been commercially exploited with a considerable degree of success and the apparatus shown and described herein has proven especially effective in the performance of the several steps of the method.

It is not desired or intended to limit this invention to the exact details of construction or the precise steps of the method herein shown and described since various modifications within the scope of the appended claims may occur to persons skilled in the art to which this invention pertains.

I claim:

1. The method of producing flexible containers, which comprises, longitudinally advancing a flat tube of flexible material along a predetermined path, sealing the tube transversely thereacross at spaced intervals to provide a succession of transverse seals, transversely perforating the tube adjacent to and rearwardly beyond each of the transverse seals, thereafter completely severing the tube transversely thereacross adjacent to and rearwardly beyond each of the lines of perforations while continuing the advancement thereof to thereby provide successive separated sections, and finally clamping the trailing portion of each section rearwardly beyond the transverse perforations thereof while continuing the advancement of the section to thereby remove such portion.

2. The method of producing flexible containers, which comprises, longitudinally advancing a flat tube of flexible thermo-plastic material along a predetermined path, applying sealing heat transversely across the tube at spaced intervals to provide a succession of transverse seals, transversely perforating the tube adjacent to and rearwardly beyond each of the transverse seals, thereafter completely severing the tube transversely thereacross adjacent to and rearwardly beyond each of the lines of perforations while continuing the advancement thereof to thereby provide successive separated sections, and finally clamping the trailing portion of each section rearwardly beyond the transverse perforations thereof while continuing the advancement of the section to thereby remove such portion.

3. The method of producing flexible containers, which comprises, longitudinally advancing a flat tube of flexible thermo-plastic material along a predetermined path, applying sealing heat and pressure transversely across the tube at spaced intervals while momentarily arresting the advancement thereof to provide a succession of transverse seals, transversely perforating the tube adjacent to and rearwardly beyond each of the transverse seals, thereafter completely severing the tube transversely thereacross adjacent to and rearwardly beyond each of the lines of perforations while continuing the advancement thereof to thereby provide successive separated sections, and finally clamping the trailing portion of each section rearwardly beyond the transverse perforations thereof while continuing the advancement of the section to thereby remove such portion.

4. The method of producing flexible containers, which comprises, longitudinally advancing a flat seamless tube of flexible thermo-plastic material along a predetermined path, applying sealing heat transversely across the tube at spaced intervals to provide a succession of transverse seals, transversely perforating the tube adjacent to and rearwardly beyond each of the transverse seals, thereafter completely severing the tube transversely thereacross adjacent to and rearwardly beyond each of the lines of perforations while continuing the advancement thereof to thereby provide successive separated sections, then clamping the trailing portion of each section beyond the transverse perforations thereof while continuing the advancement of the section to thereby remove such portion, and finally separating the successive sections from the removed portions during advancement thereof.

5. The method of producing flexible containers, which comprises, longitudinally advancing a flat tube of flexible thermo-plastic material along a predetermined path, applying sealing heat transversely across the tube along a substantially arcuate line at spaced intervals to provide a succession of substantially arcuate transverse seals, perforating the tube adjacent to and rearwardly beyond each of the transverse seals along a similar substantially arcuate line, thereafter completely severing the tube transversely thereacross adjacent to and rearwardly beyond each of the lines of perforations along a substantially straight line perpendicular to the side edges of the tube while continuing the advancement thereof to thereby provide successive separated sections, and finally clamping the corners of the trailing portion of each section rearwardly beyond the transverse perforations thereof while continuing the advancement of the section to thereby remove such portion.

6. The method of producing flexible containers, which comprises, longitudinally advancing a flat tube of flexible thermo-plastic material along a predetermined path, applying sealing heat transversely across the tube at spaced intervals to provide a succession of transverse seals, transversely perforating the tube with the aid of heat adjacent to and rearwardly beyond each of the transverse seals, thereafter completely severing the tube transversely thereacross adjacent to and rearwardly beyond each of the lines of perforations while continuing the advancement thereof to thereby provide successive separated sections, and finally clamping the trailing portion of each section rearwardly beyond the transverse perforations thereof while continuing the advancement of the section to thereby remove such portion along the perforated line.

7. The method of producing flexible containers, which comprises, longitudinally advancing a flat tube of flexible thermo-plastic material along a predetermined path, momentarily arresting the advancement of the tube and applying sealing heat and pressure transversely thereacross at spaced intervals to provide a succession of transverse seals, simultaneously transversely perforating the tube with the aid of heat adjacent to and rearwardly beyond each of the transverse seals, thereafter completely severing the tube transversely thereacross adjacent to and rearwardly beyond each of the lines of perforations while continuing the advancement thereof to thereby provide successive separated sections, and finally clamping the trailing portion of each section rearwardly beyond the transverse perforations thereof while pulling the forward portion thereof longitudinally to thereby remove the trailing portion along the perforations.

8. Apparatus for producing containers from flexible tubular material, comprising, means for longitudinally advancing the tube in flattened condition along a predetermined path, means for sealing the tube transversely thereacross at spaced intervals to provide a succession of transverse seals, means for transversely perforating the tube adjacent to and rearwardly of each of said transverse seals, means for completely severing the tube transversely thereacross adjacent to and rearwardly of each of said lines of perforations to thereby provide successive separated sections, means for clamping the trailing portion of each section rearwardly of the transverse perforations thereof, and means for pulling the forward portion of each section away from said clamping means to continue the advancement thereof and thereby remove the clamped portion.

9. Apparatus for producing containers from flexible thermo-plastic tubular material, comprising, means for longitudinally advancing the tube in flattened condition along a predetermined path, heat sealing means extending transversely across and intermittently cooperable with the tube for sealing the same at spaced intervals to provide a succession of transverse seals, means for transversely perforating the tube adjacent to and rearwardly of each of said transverse seals, a knife extending transversely across and intermittently cooperable with the tube to sever the same adjacent to and rearwardly of each of said lines of perforations and thereby provide successive separated sections, clamping means for holding the trailing portion of each section rearwardly of the transverse perforations thereof, and means cooperable with the forward portion of each section for pulling the same away from said clamping means to continue the advancement thereof and thereby remove the clamped portion.

10. Apparatus for producing containers from flexible thermo-plastic tubular material, comprising, means for longitudinally advancing the tube in flattened condition along a predetermined path, heat and pressure sealing means extending transversely across and intermittently movable into contact with the tube for sealing the same at spaced intervals to provide a succession of transverse seals, a hot knife having local interruptions and intermittently cooperable with the tube for transversely perforating the same adjacent to and rearwardly of each of said transverse seals, a cut-off knife extending transversely across and intermittently cooperable with the tube for completely severing the same adjacent to and rearwardly of each of said lines of perforations to thereby provide successive separated sections, clamping means momentarily cooperable with the trailing portion of each section rearwardly of the transverse perforations thereof, and means cooperable with the forward portion of each section for pulling the same longitudinally away from said clamping means to thereby remove the clamped portion along said perforations.

11. Apparatus for producing containers from flexible thermo-plastic tubular material, comprising, means for longitudinally advancing the tube in flattened condition along a predetermined path, heat and pressure sealing means extending transversely across the path and out of contact with the tube, a perforating knife also extending transversely across the path and out of contact with the tube adjacent to and rearwardly of said sealing means, means for heating said knife, means for intermittently simultaneously moving said sealing means and said knife into contact with said tube to provide a succession of transverse seals and adjacent perforations therein, a cut-off knife extending transversely across and intermittently cooperable with the tube for completely severing the same adjacent to and rearwardly of each of said lines of perforations to thereby provide successive separated sections, clamping means cooperable with the trailing portion of each section rearwardly of the transverse perforations thereof, and means cooperable with the forward portion of each section for pulling the same longitudinally away from said clamping means to thereby remove the clamped portions along said perforations.

12. Apparatus for producing containers from flexible thermo-plastic tubular material, comprising, means for longitudinally advancing the tube in flattened condition along a predetermined path, a sealing bar extending transversely across the path and out of contact with the tube, a perforating knife having the same contour as said sealing bar also extending transversely across the path and out of contact with the tube adjacent to and rearwardly of said bar, means for heating said sealing bar and said knife, means for intermittently simultaneously moving said sealing bar and said knife into contact with and under pressure against said tube to provide a succession of transverse seals and rearwardly adjacent perforations therein, a cut-off knife extending transversely across and intermittently cooperable with the tube for completely severing the same adjacent to and rearwardly of each set of perforations to thereby provide successive separated sections, intermittently movable clamping means cooperable with the trailing portion of each section rearwardly of the transverse perforations thereof, means cooperable with the forward portion of each section for pulling the same longitudinally away from said clamping means to thereby remove the clamped portion along said perforations, and means movable into and out of the path of said sections for separating the removed trailing portions from said forward portions.

References Cited in the file of this patent

UNITED STATES PATENTS

| 2,333,440 | Potdevin | Nov. 2, 1943 |
| 2,347,439 | Shea et al. | Apr. 25, 1944 |
| 2,679,280 | Marsh | May 25, 1954 |